US010761293B2

(12) United States Patent
Brown

(10) Patent No.: US 10,761,293 B2
(45) Date of Patent: Sep. 1, 2020

(54) SYSTEMS AND METHODS FOR PROVIDING MIRRORS WITH HIGH STIFFNESS AND LOW INERTIA INVOLVING CHEMICAL ETCHING

(71) Applicant: NOVANTA CORPORATION, Bedford, MA (US)

(72) Inventor: David C. Brown, Northborough, MA (US)

(73) Assignee: Novanta Corporation, Bedford, MA (US)

( * ) Notice: Subject to any disclaimer, the term of this patent is extended or adjusted under 35 U.S.C. 154(b) by 600 days.

(21) Appl. No.: 15/195,156

(22) Filed: Jun. 28, 2016

(65) Prior Publication Data

US 2017/0045709 A1   Feb. 16, 2017

Related U.S. Application Data

(62) Division of application No. 13/560,023, filed on Jul. 27, 2012, now abandoned.

(60) Provisional application No. 61/513,274, filed on Jul. 29, 2011.

(51) Int. Cl.
*G02B 7/182* (2006.01)
*G02B 26/10* (2006.01)
*C23F 1/30* (2006.01)

(52) U.S. Cl.
CPC .............. *G02B 7/1821* (2013.01); *C23F 1/30* (2013.01); *G02B 26/105* (2013.01)

(58) Field of Classification Search
CPC ........ G02B 7/1821; G02B 26/105; C23F 1/30

USPC ......................................... 359/871, 900, 848
See application file for complete search history.

(56) References Cited

U.S. PATENT DOCUMENTS

| 2,162,590 | A | | 6/1939 | Richter | |
|---|---|---|---|---|---|
| 2,439,999 | A | | 4/1948 | Adams | |
| 2,658,317 | A | | 11/1953 | Morgan | |
| 3,487,520 | A | | 1/1970 | Lenhart et al. | |
| 3,524,132 | A | | 8/1970 | Allen | |
| 3,799,680 | A | * | 3/1974 | Weisner | G01J 1/04 356/225 |
| 4,492,669 | A | * | 1/1985 | Gould | B22F 5/10 164/230 |
| 4,685,778 | A | * | 8/1987 | Pollock | C23C 14/021 216/109 |

(Continued)

FOREIGN PATENT DOCUMENTS

| CN | 101930088 A | 12/2010 |
|---|---|---|
| JP | 2005-010453 A | 1/2005 |

(Continued)

OTHER PUBLICATIONS

English translation of the Search Report & First Office Action dated Jul. 27, 2015 in connection with related Chinese Patent Application No. 201280031879.5, 5 pages.

(Continued)

*Primary Examiner* — Ricky D Shafer
(74) *Attorney, Agent, or Firm* — Gesmer Ugdegrove LLP

(57) ABSTRACT

A method is disclosed of fabricating a mirror for use in limited rotation motor systems, said method comprising the steps of providing a mirror structure including at least one wall section, and exposing the at least one wall section to a fluid etching agent to thereby provide chemical milling of the mirror structure.

20 Claims, 6 Drawing Sheets

(56) References Cited

U.S. PATENT DOCUMENTS

| | | | |
|---|---|---|---|
| 4,985,778 | A | 1/1991 | Ayata et al. |
| 5,076,700 | A * | 12/1991 | DeCaprio ............... 359/848 |
| 6,108,121 | A * | 8/2000 | Mansell ............ G02B 26/0841 |
| | | | 359/224.1 |
| 6,316,288 | B1 | 11/2001 | Hashimoto |
| 6,939,475 | B2 * | 9/2005 | Satoh ................. C30B 33/00 |
| | | | 216/47 |
| 7,212,325 | B2 | 5/2007 | Pruyn |
| 7,365,464 | B2 | 4/2008 | Brown |
| 7,404,647 | B1 | 7/2008 | Brown |
| 7,582,219 | B1 | 9/2009 | Asai et al. |
| 7,672,343 | B2 | 3/2010 | Brown |
| 8,911,098 | B2 * | 12/2014 | Schaeffer et al. ............. 359/848 |
| 2007/0268543 | A1 | 11/2007 | Cho et al. |
| 2009/0062024 | A1 | 3/2009 | DeBoalt |
| 2010/0103546 | A1 | 4/2010 | Schaefer et al. |
| 2010/0271679 | A1 | 10/2010 | Brown et al. |

FOREIGN PATENT DOCUMENTS

| | | | |
|---|---|---|---|
| JP | 2005-506909 A | 3/2005 |
| JP | 2007-310342 A | 11/2007 |
| JP | 2008-209653 A | 9/2008 |
| JP | 2010-008613 A | 1/2010 |
| JP | 2011-064964 A | 3/2011 |
| KR | 1020010040117 A | 5/2001 |

OTHER PUBLICATIONS

Office Action issued by the European Patent Office dated Apr. 13, 2015 in connection with related European Patent Application No. 12819641.7 (1 page).

Office Action issued European Patent Office dated Mar. 7, 2014 in connection with related European Patent Application No. 12819641.7 (3 pages).

Geyl et al., "Progress toward a third Gemini M2 mirror", SPIE, vol. 5869, Aug. 25, 2005, pp. 586901-1-586901-4.

Dohring et al., "Manufacturing of lightweighted ZERODUR components at SCHOTT", SPIE, vol. 6666, Aug. 26, 2007, pp. 666602-1-666602-9.

European Search Report dated Mar. 23, 2015 in connection with related European Patent Application No. 12819641.7 (7 pages).

International Preliminary Report on Patentability dated Feb. 13, 2014 in connection with International Application PCT/US2012/048513, 5 pages.

International Search Report and Written Opinion dated Jan. 22, 2013 in connection with International Patent Application No. PCT/US2012/048513 filed on Jul. 27, 2012, 8 pages.

English translation of the Second Office Action dated Feb. 23, 2016 in connection with related Chinese patent application No. 201280031879.5, 5 pages.

English translation of the Office Action dated May 31, 2016 in connection with related Japanese patent application No. 2014-523988, 3 pages.

Third Office Action issued State Intellectual Property Office in related CN Patent Application No. 201280031879.5 dated Aug. 5, 2016 (14 sheets with translation).

Office Action issued in related Japanese Patent Application No. 2014-523988 dated May 31, 2016 (8 sheets).

Korean Intellectual Property Office Notice of Submission of Opinion issued on Aug. 13, 2018 in related Korean Patent Application No. 10-2014-7001191, 9 pages.

English Translation of Korean Intellectual Property Office Notice of Submission of Opinion issued on Aug. 13, 2018 in related Korean Patent Application No. 10-2014-7001191, 7 pages.

Korean Intellectual Property Office Notice of Submission of Opinion, and its English translation, issued on May 31, 2019 in related Korean Patent Application No. 10-2014-7001191, 16 pages.

Non-Final Office Action issued by the United States Patent and Trademark Office dated Nov. 18, 2015, in related U.S. Appl. No. 13/560,023, 9 pages.

Communication pursuant to Rules 161(2) and 162 EPC issued by the European Patent Office dated Mar. 7, 2014 in related European Patent Application No. 12819641.7, 3 pages.

* cited by examiner

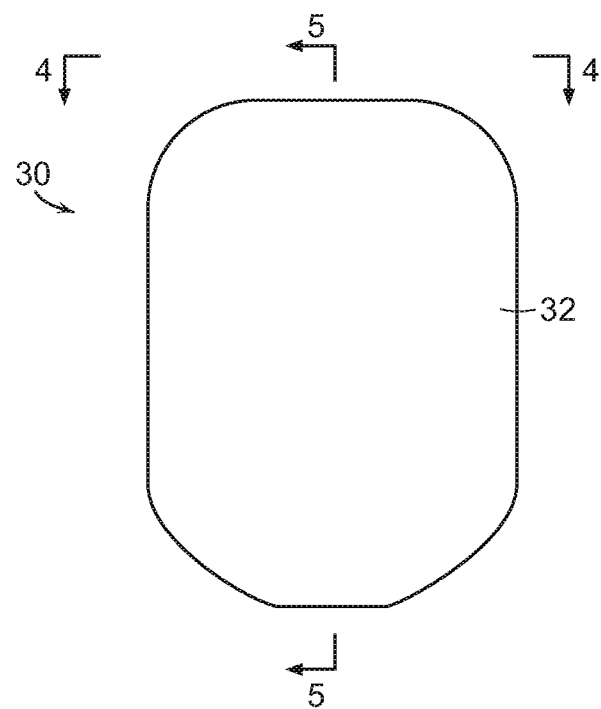
FIG. 3
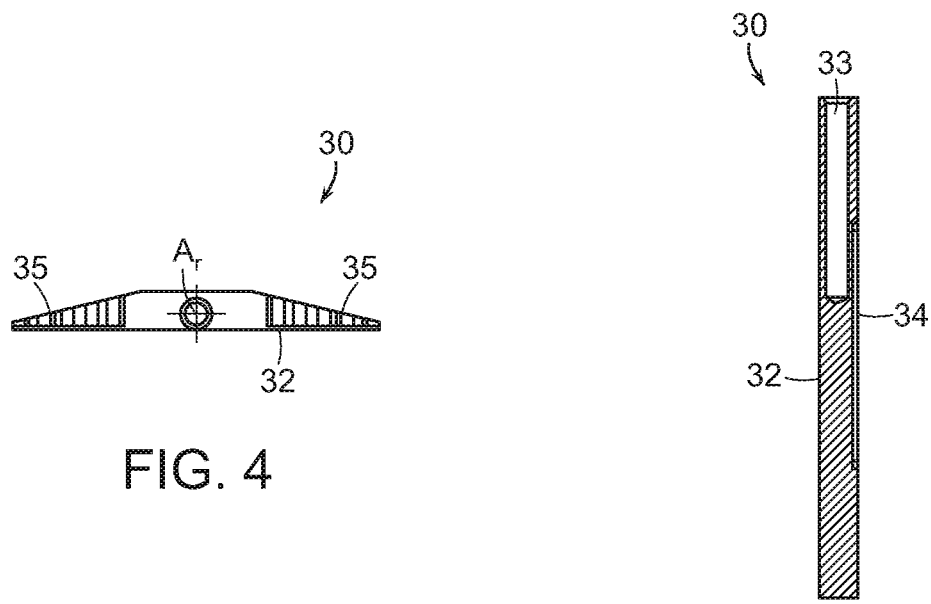
FIG. 4
FIG. 5

US 10,761,293 B2

SYSTEMS AND METHODS FOR PROVIDING MIRRORS WITH HIGH STIFFNESS AND LOW INERTIA INVOLVING CHEMICAL ETCHING

PRIORITY

The present application is a divisional of U.S. patent application Ser. No. 13/560,023 filed Jul. 27, 2012, that claims priority to U.S. Provisional Patent Application Ser. No. 61/513,274 filed Jul. 29, 2011, both of which are hereby incorporated herein by reference in their entireties.

BACKGROUND

The present invention generally relates to the fabrication of optical components in limited rotation motor systems, and relates in particular, to the fabrication of such components having high stiffness and low inertia.

Scanning mirror systems generally include a mirror surface that is either mounted on a substrate or is formed as part of a substrate, wherein the substrate is coupled to a shaft of a motor system. Such motors may either run continuously (e.g., for use with a polygonal mirror) or such motors may be limited rotation motors providing movement within a limited angular range. These applications require that the mirror be as stiff as possible consistent with a minimum of inertia as they are accelerated back and forth over the limited angular range.

In typical limited rotation scanning systems (also called galvanometer systems) a mirror is mounted to the output shaft of a limited rotation motor and the limited rotation motor is controlled by a control loop that seeks to cause the rotor of the motor, and therefore the mirror, to follow a position and velocity command waveform with arbitrarily high fidelity.

There are limits, however, on the fidelity with which the system may follow the command. For example, the acceleration of the mirror within the system is limited by the rate of rise of current in the motor windings. The positional precision is limited by the signal to noise ratio of the feedback method. The bandwidth of the system (which is its ability to move from position A to position B at a desired high velocity and to then settle at position B precisely in the shortest possible time), is limited primarily by vibrations in the moving parts. The bandwidth of the system will nominally be ½ the first torsional resonance in the moving structure.

It is customary, therefore, to make the moving parts as stiff as possible within the constraints of the allowable system inertia. Since the torque required of the motor to reach a specified acceleration is directly proportional to the inertia and is proportional to the current (whose rate of rise is limited as noted above), it is often the case that when the system parameters are optimized for a particular inertia, some component, typically the mirror, even when made of a very high stiffness-to-inertia material, is not as stiff as is required to reach system bandwidth goals. In this case, extra material is added to the mirror to increase its stiffness, but, at the cost of additional inertia, requiring a larger, more expensive motor as well as a control loop that is capable of driving the additional inertia.

There is a need therefore, for a limited rotation motor system that provides improved bandwidth without requiring a larger, more expensive motor and accompanying control system.

SUMMARY

In accordance with an embodiment, the invention provides a method of fabricating a mirror for use in limited rotation motor systems. The method includes the steps of providing a mirror structure including at least one wall section, and exposing the at least one wall section to a fluid etching agent to thereby provide chemical milling of the mirror structure.

In accordance with another embodiment, the invention provides a mirror for use in a limited rotation motor system, and the mirror includes a backing structure opposite a front of the mirror. The backing structure includes at least one wall section having a tapered shape that tapers as the wall extends away from the front of the mirror.

In accordance with a further embodiment, the invention provides a mirror for use in a limited rotation motor system that includes a backing structure opposite a front of the mirror, and the backing structure includes features that provide rigidity to the mirror and that have thicknesses that become reduced in a direction away from a front of the mirror.

BRIEF DESCRIPTION OF THE DRAWINGS

The following description may be further understood with reference to the accompanying drawings in which:

FIG. 3 shows an illustrative diagrammatic front view of a mirror substrate to be processed in accordance with an embodiment of the present invention;

FIG. 4 shows an illustrative diagrammatic top view of the mirror substrate shown in FIG. 3 taken along line 4-4 thereof;

FIG. 5 shows an illustrative diagrammatic side sectional view of the mirror substrate shown in FIG. 3 taken along line 5-5 thereof;

The drawings are shown for illustrative purposes only.

DETAILED DESCRIPTION

Certain high stiffness and low inertia materials are known to be used for making moving (or dynamic) mirrors that move during use, such as mirrors in limited rotation motor systems. It is desired that such mirrors (ideally) have infinite stiffness and zero inertia, and beryllium for example, provides an excellent choice given its high stiffness and low mass.

It is also known that mirror structures may be machined to further reduce the mass of the mirror, specifically on the back of the mirror and near the edges furthest from the axis of rotation of the mirror. This machining is designed to further reduce the mass of the mirror while not significantly reducing the stiffness of the mirror. In this regard, it is desired to machine the mirror in such a way that walls remain to provide stiffness (e.g., in a honeycomb pattern) that are as thin as possible.

While materials used for mirror structures have very low specific inertia (gm-cm$^2$ per unit area), it is difficult to machine certain low inertia materials such as beryllium to very fine thicknesses without cracking. Beryllium is also expensive to machine and produces a dust that is hazardous. Machine tooling is generally unique to specific materials, requiring various speeds, feeds, lubricants, coolants, tool geometries materials and coatings. It is therefore desirable to increase the manufacturing speed of beryllium mirrors, and at the same time, overcome the limitations of the known machining art.

Figure 1:
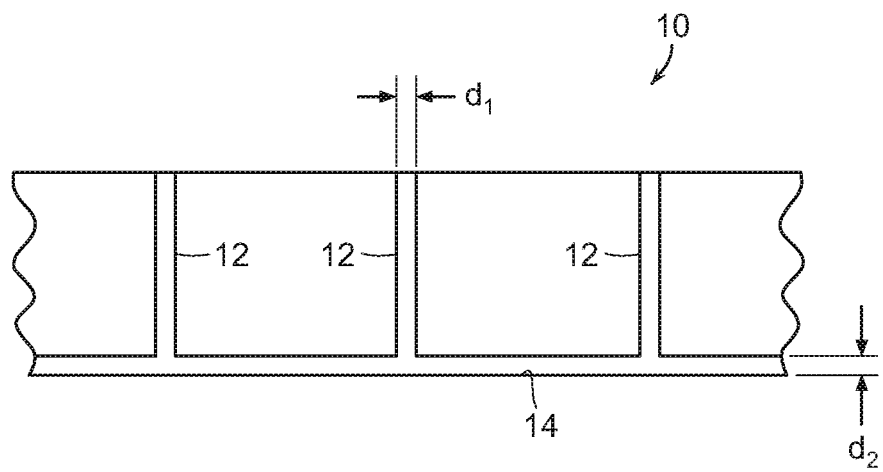
FIG. 1 shows an illustrated diagrammatic enlarged view of a portion of a limited rotation motor to be processed in accordance with the present invention.

FIG. 1 shows at 10 a beryllium mirror substrate, including wall sections 12 and a floor 14 that remain following material removal. As is know in the art, a computer file representing a solid model may be converted directly into machining instructions on a machine tool that mills the part in plan, drills the longitudinal hole, and performs such secondary operations such as drilling and tapping holes as may be required while still a section of a surface of the parent beryllium block.

The substrate 10 may be further processed by removing it from the parent material block on which it is milled by means of a sawing-off process such as wire EDM (Electrical Discharge Machining) or electro chemical sawing. The separated substrate is then finished typically in accordance with desired tolerances. It may then conventionally be used as-is, or further processed by plating, vacuum coating, or both.

The present invention is directed to a process for generating the substrate itself. As is known to those skilled in the machining art, the production of a single substratum on a face of a parent block or the production of a multiplicity of substrata on one or more faces of a parent block or in fact the production of a single substratum from a single near-net-shape block all share the same issues and therefore these variants do not depart from the spirit and scope of the invention. The exact size and shape of the substratum and the precise configuration of the stiffening structure on the back of the mirror are variants that do not depart from the spirit and scope of the present invention.

One of the difficulties in machining beryllium is that the surface develops cracking as a result of the machining forces and the heat developed. With care, using very sharp tools, flood coolant, and spindle speeds in milling under 10,000 RPM these cracks are restricted to the top 10 microns or so of the surface. Even so, they must be removed after machining and before use because otherwise they tend to grow in length and depth, particularly if the part is stressed as during acceleration, until they meet in the interior of the part and cause rupture.

Unfortunately, when the section thickness of the beryllium is severely reduced (as it must be in order to produce the low inertia desired in mirror substrates) at some reduced thickness, section bending takes place during machining. This bending causes deeper cracking. As a result, the minimum section thickness practical has been approximately 0.5 mm in structures of the scale of mirror substrates as shown at $d_1$ in FIG. 1. This section thickness then essentially puts a lower limit on the inertia that can be achieved.

The surface cracking caused during machining such as milling may be removed by immersing the clean part after machining in an etchant solution such as 60% concentration hydrofluoric acid (HF) 1 part and 69% concentration nitric acid ($HNO_3$) 9 parts or other suitable etchant. The material removal rate at 20C+/−5C is about 18 microns per minute per surface exposed to the etchant. Although this may seem slow compared with typical milling tooth loading of 5 microns at a spindle speed of 10000 RPM, the milling takes place over a single line contact somewhere on the part, whereas the etching takes place simultaneously over the entire exposed surface of the part, and is therefore much faster. In general, because of the linear relationship between material removed and immersion time, agitation bath composition and temperature remaining constant, it is adequate for the desired metal removal depth to be controlled by the time the part is immersed in the bath.

As the depth-to-width ratio of any enclosed areas on the backing structure increases however, general agitation becomes less effective and surface tension of the etchant tends to keep the exhausted chemicals in place on the walls to be thinned. In order to more completely refresh the local effectiveness of the etchant, it is necessary to periodically move the local surface of the etchant up and down the walls so that the integrated position of the surface of the etchant over time resembles a slow withdrawal of the part out of the bath with a dither. In other words, the part is withdrawn at a constant rate superimposed on which there is a small up-and-down motion that has the effect of washing away any exhausted etchant adhering to the walls.

In accordance with an embodiment of the invention, a beryllium mirror structure (such as shown in FIG. 1) may remain in the etching bath for an extended period of time of, for example, 5 to 6 minutes, with the last minute, for example, providing a period of time during which the substrate is being slowly removed from the etchant bath as discussed in more detail below. Following such a treatment, sections of the beryllium structure become etched to much smaller dimensions as shown at 20 in FIG. 2. The etched walls are shown at 22 and the etched floor is shown at 24. The thickness of the floor section, for example, may be reduced from $d_2$ (e.g., about 0.5 mm) to $d_4$ (e.g., about 0.4 mm). Further, the wall sections become tapered, having triangular cross-sectional shapes. The thickness of the wall sections, for example, may be reduced from $d_1$ (again e.g., about 0.5 mm) to walls having a variable thickness that is for example, about 0.25 mm at the thickest part ($d_3$) down to possibly zero at the top. This has the desirable effect of further reducing the mass of the ribbing and therefore the inertia of the part, particularly since more mass is removed further from the axis of rotation of the mirror. The tapering may be controlled by controlling the rate of removal of the substrate from the fluid bath as well as by controlling the agitation of the substrate within the fluid bath as discussed in more detail below.

Mirrors formed of such a process were tested and found to be exceptionally low in specific inertia. During further development of the process, it was found that the ribs could be reliably reduced to a line at the top without reducing their height (stiffness) simply by controlling the immersion time. The triangular shaping of the rib cross-section is attributed to partial exhaustion of the etchant inside the closed cells.

Although the removal of material from the reflective face of the substrate reduces its inertia, it also reduces its stiffness: however, a minimum stiffness is required in order to support the forces produced during polishing of the reflective surface. In keeping with the requirement that the reflective surface be flat to ¼ wavelength or better at the wavelength of use, it follows then that the required minimum section thickness (the inverse of stiffness first order therefore inertia all other things remaining constant) will vary with the intended wavelength of use. Conventionally, it was necessary to machine a mirror substratum to a section thickness in inverse proportion to the intended wavelength of use (¼ of a shorter wavelength is a smaller absolute allowed departure from flatness, and so requires a stiffer substrate).

FIGS. 3-7 show a beryllium mirror structure 30 having a front side 32 that provides a highly reflective surface and a back side 34. The sides furthest from the axis of rotation ($A_R$) of the mirror are reduced as shown at 35, and a cavity 33 may be provided that contains mirror damping material as disclosed, for example, in U.S. Patent Application Publication No. 2010/0271679, the disclosure of which is hereby incorporated by reference in its entirety. As shown at 36 in FIGS. 6 and 7, the back side 34 is machined to removed beryllium material in a honeycomb pattern from areas 36, leaving wall sections 38 that are six sided and formed adjacent one another to provide support for the mirror yet with a reduced weight (due to the removal of material).

Figure 8A:
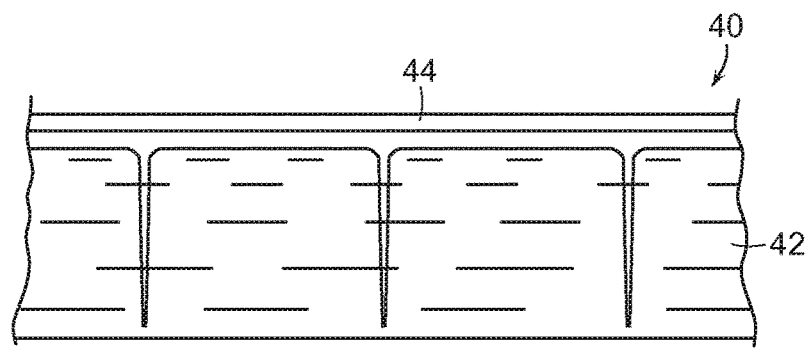
FIGS. 8A-8C show illustrative diagrammatic enlarged views of a portion of a mirror substrate being processed in accordance with an embodiment of the present invention.
Figure 8B:
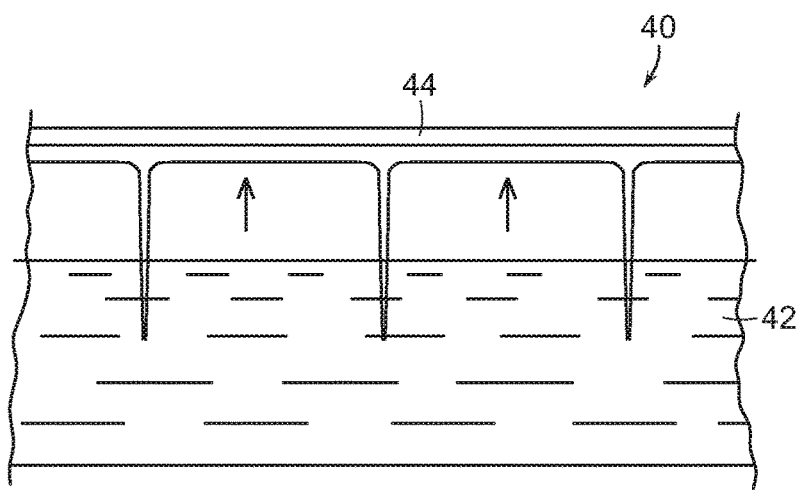
Figure 8C:
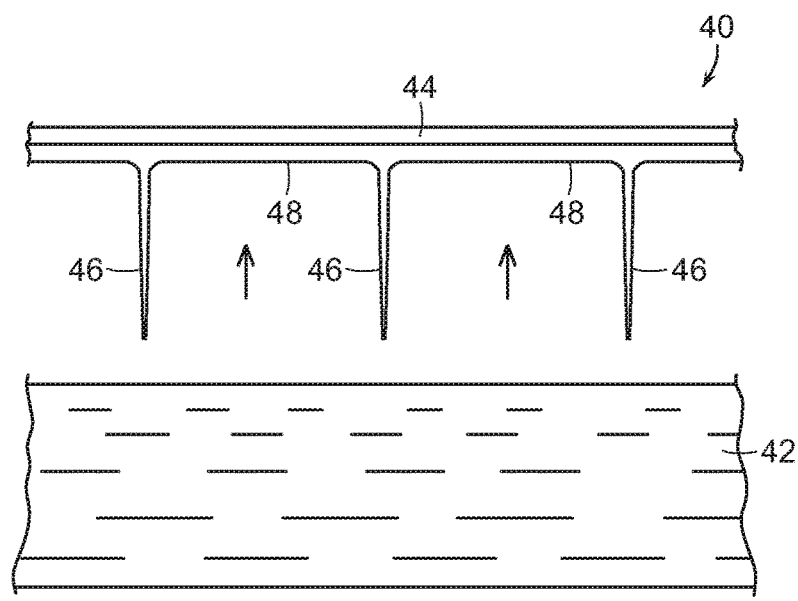

As shown in FIGS. 8A-8C, the substrate 40 may be processed by immersion in the etchant solution 42 discussed above. A protective film 44 is provided over the highly reflective mirror surface to prevent etching of the highly reflective mirror surface. By controlling the rate of separation of the substrate 40 from the etchant solution 42, the shapes of the walls 46 may be controlled, permitting the walls 46 to be thinnest furthest from the highly reflective mirror surface. The taper of the walls, therefore, may be linear or non-linear. The walls 46 and the floors 48 still define generally hexagonal shapes, but are thinner, particularly at the further ends thereof.

Figure 2:
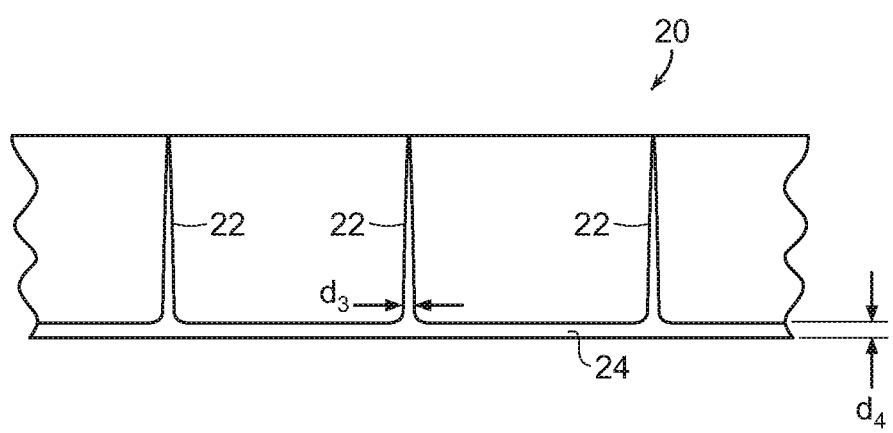
FIG. 2 shows an illustrated diagrammatic enlarged view of a portion of a mirror substrate following processing in accordance with an embodiment of the present invention.
Figure 6:
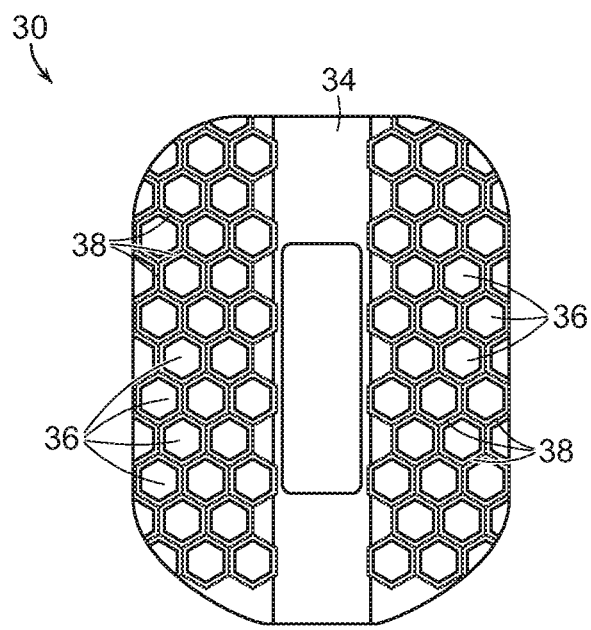
FIG. 6 shows an illustrative diagrammatic back view of the mirror substrate shown in FIG. 3.
Figure 7:
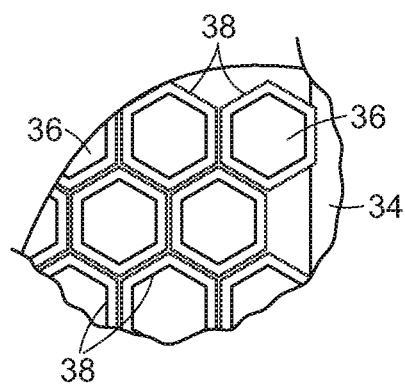
FIG. 7 shows an illustrative diagrammatic enlarged view of a portion of the back of the mirror substrate shown in FIG. 6.
Figure 9:
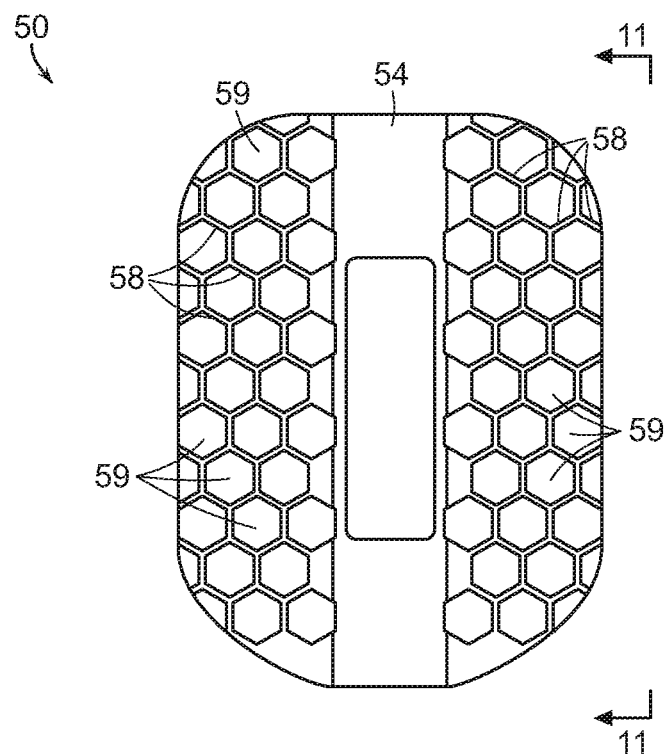
FIG. 9 shows an illustrative diagrammatic back view of a mirror substrate that has been processed in accordance with an embodiment of the present invention.
Figure 10:
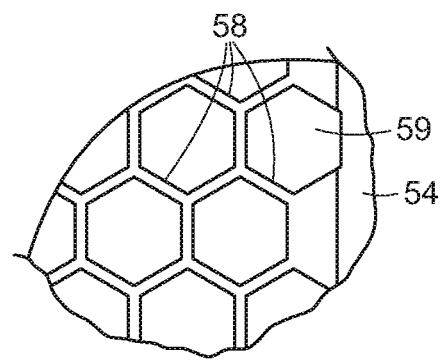
FIG. 10 shows an illustrative diagrammatic enlarged view of a portion of the back of the mirror substrate shown in FIG. 9.
Figure 11:
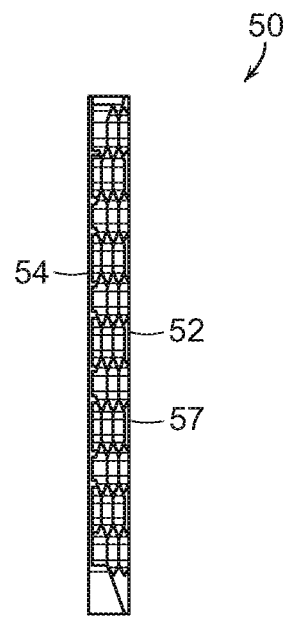
FIG. 11 an illustrative diagrammatic side view of the mirror substrate shown in FIG. 9 taken along line 11-11 thereof.
Figure 12:
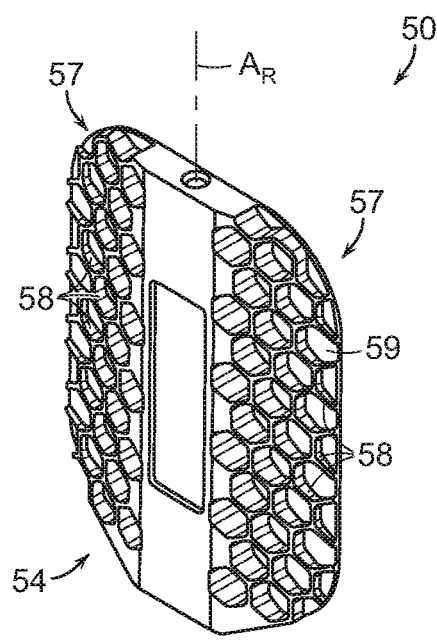
FIG. 12 shows an illustrative diagrammatic isometric view of the mirror substrate of FIG. 9.

With reference to FIGS. 9-12, following chemical treatment in the fluid etching agent, the wall sections 58 and the floor 59 of the mirror structure 50 are etched to provide tapered shapes as shown in FIG. 2. The wall sections, in particular, have a shape that tapers as the wall extends away from the highly reflective surface of the mirror. Again, the front side 52 of the mirror 50 remains unetched due to masking. As shown in FIGS. 9 and 10, the hexagonal shaped walls have a reduced thickness due to the etching, yet still provide structural support for the mirror. As shown at 57 in FIGS. 11 and 12, the hexagonal walls are shorter in height near the lateral edges away from the axis of rotation of the mirror ($A_R$).

Because the etching process is fast and un-attended, the present invention is very economical compared with the machining of discrete individual section thicknesses, so that even if in the future a method is found which allows the direct machining of thinner sections than those now possible, processes of the invention will continue to provide a more economical approach to the production of very thin very low inertia mirrors. In practice therefore, a single rather thick substrate is milled or otherwise machined in multiple units, and the individual units are then processed using etching to the final dimensions required for a particular wavelength or wavelength interval of use.

In accordance with various embodiments of the invention, therefore, a section of beryllium mirror stiffening ribs and/or a face may be reduced to a desired thickness by etching, and/or by masking the exposed mirror face to effectively deepen the ribs without causing cracking in the reflecting face. In accordance with further embodiments, a rate of mechanical agitation may be controlled to control the partial exhaustion of the etchant so that triangular cross-sections thinner at the open end are produced. In accordance with further embodiments, selected areas of the mirror substrate may be masked prior to etching to prevent etching in those areas, and in further embodiments, the etching substrata may be machined to a uniform over-size section thickness to a variable final desired section thickness.

Figure 13:
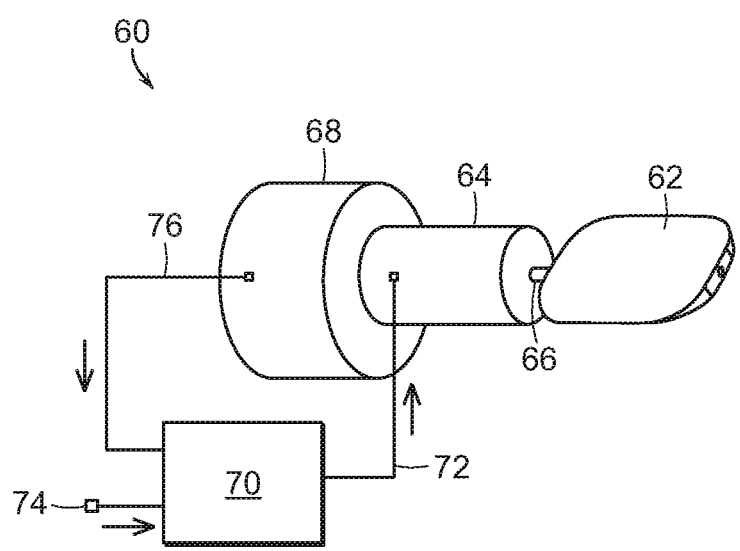
FIG. 13 shows an illustrative diagrammatic view of a limited rotation motor system using an optical element that includes a mirror substrate of the present invention.

As further shown in FIG. 13, in a limited rotation motor system 60, the optical element 62 (e.g., the mirror 50) is coupled to a limited rotation motor 64 via mirror mounting structure 66 (e.g., via a clamp, threaded mounting structure and/or a tapered mounting structure as disclosed for example in U.S. Pat. No. 7,212,325, the disclosure of which is hereby incorporated by reference in its entirety) for rotation about the motor rotor axis $A_R$. The system 60 also includes a position transducer 68 that is coupled to a feedback control system 70 that provides a command signal 72 to the motor 64 responsive to an input command signal from an input node 74 and a feedback signal 76 from the position transducer 68 to control the speed and/or position of the motor shaft, and therefore the optical element 62.

The feedback control system is used to cause the rotor of the motor, and therefore the mirror, to follow a position and velocity command waveform with arbitrarily high fidelity. There are limits however, on the fidelity with which the system may follow the input command signal. The acceleration of the mirror in the system for example, is limited by the rate of rise of current in the motor windings, and the positional precision is limited by the signal to noise ratio of the feedback system. The ability of the system to move the mirror from a position A to a position B at a desired high velocity and to then settle at position B precisely in the shortest time (the bandwidth of the system) is limited primarily by vibrations in the moving parts. Providing a mirror substrate in accordance with the invention advantageously permits the mirror to be very high in stiffness yet low in inertia.

Those skilled in the art will appreciate that numerous modifications and variations may be made to the above disclosed embodiments without departing from the spirit and scope of the invention.

What is claimed is:

1. A method of fabricating a mirror for use in limited rotation motor systems, comprising:
   providing a mirror structure including a beryllium mirror structure comprising a plurality of wall sections arranged in one or more shaped patterns;
   exposing the beryllium mirror structure to a bath that includes a fluid etching agent;
   mechanically agitating the bath during exposure of the beryllium mirror structure to the fluid etching agent and drawing the beryllium mirror structure from the bath including the fluid etching agent at a controlled rate such that the plurality of wall sections are chemically milled to have a triangular cross sectional thickness that tapers towards an open end of the wall sections.

2. The method as claimed in claim 1, wherein said fluid etching agent includes hydrofluoric acid (HF).

3. The method as claimed in claim 1, wherein said fluid etching agent includes nitric acid ($HNO_3$).

4. The method as claimed in claim 1, wherein said mirror structure further includes a front reflective mirror surface.

5. The method as claimed in claim 1, wherein said mirror structure is removed from the fluid etching agent when the mirror reaches a target reduced weight.

6. The method as claimed in claim 1, wherein said method provides uniform milling of exposed surfaces of the beryllium structure.

7. A mirror for use in a limited rotation motor systems formed from the method of claim 1.

8. The method as claimed in claim 1, wherein said mechanically agitating the bath of the fluid etching agent comprises moving the beryllium mirror structure with an up-and-down motion in the bath of the fluid etching agent.

9. The method as claimed in claim 8, wherein the bath of the fluid etching agent is mechanically agitated while drawing the beryllium mirror structure from the bath.

10. A method of fabricating a mirror for use in limited rotation motor systems, comprising:
providing a mirror unit including a backing structure that is opposite a mirror surface, wherein the backing structure comprises a plurality of wall sections arranged in one or more shaped patterns, said wall sections each having a base and an open end;
exposing the backing structure to a bath that includes a fluid etching agent to thereby provide chemical milling of the backing structure, wherein the fluid etching agent comprises 60% concentration hydrofluoric acid (HF) one part and 69% concentration of nitric acid ($HNO_3$) nine parts;
wherein one or more of the plurality of wall sections of the backing structure is chemically milled to have a cross sectional thickness that tapers from the base to the open end of the one or more wall sections, a thickness of the base being reduced by close to 50% and a thickness of the open end being reduced to close to 100%.

11. The method as claimed in claim 10, wherein said backing structure includes beryllium.

12. The method as claimed in claim 10, wherein the plurality of wall sections are chemically milled by mechanically agitating the bath of the fluid etching agent and drawing the backing structure from the bath at a controlled rate.

13. The method as claimed in claim 12, wherein said mechanically agitating the bath of the fluid etching agent comprises moving the backing structure with an up-and-down motion in the bath of the fluid etching agent.

14. The method as claimed in claim 13, wherein the bath of the fluid etching agent is mechanically agitated while drawing the backing structure from the bath.

15. The method as claimed in claim 10, wherein the plurality of wall sections are chemically milled to have a thickness of no greater than 0.25 mm.

16. A method of fabricating a mirror for use in limited rotation motor systems, comprising:
providing a mirror unit including a backing structure that is opposite a mirror surface and made of beryllium;
mechanically milling the backing structure to have a plurality of wall sections arranged in one or more shaped patterns, wherein each wall section is mechanically milled to a thickness of about 0.5 millimeters (mm);
exposing the backing structure to a bath of a fluid etching agent having a beryllium removal rate that is equal to about 18 microns per minute; and
mechanically agitating the bath during exposure of the backing structure to the fluid etching agent and drawing the backing structure from the bath of the fluid etching agent at a controlled rate such that the plurality of wall sections are chemically milled to have a triangular cross sectional shape that tapers from a base having a reduced thickness of about 0.25 mm towards an open end.

17. The method as claimed in claim 16, wherein the backing structure is exposed to the fluid etching agent in the agitated bath for a time in a range of about five minutes to about six minutes.

18. The method as claimed in claim 16, wherein the fluid etching agent comprises 60% concentration hydrofluoric acid (HF) one part and 69% concentration nitric acid ($HNO_3$) nine parts at a temperature in a range of about 15° C. to about 25° C.

19. The method as claimed in claim 16, wherein said mechanically agitating the bath of the fluid etching agent comprises moving the backing structure with an up-and-down motion in the bath of the fluid etching agent.

20. The method as claimed in claim 19, wherein the bath of the fluid etching agent is mechanically agitated while drawing the backing structure from the bath.

\* \* \* \* \*